Figure 1:
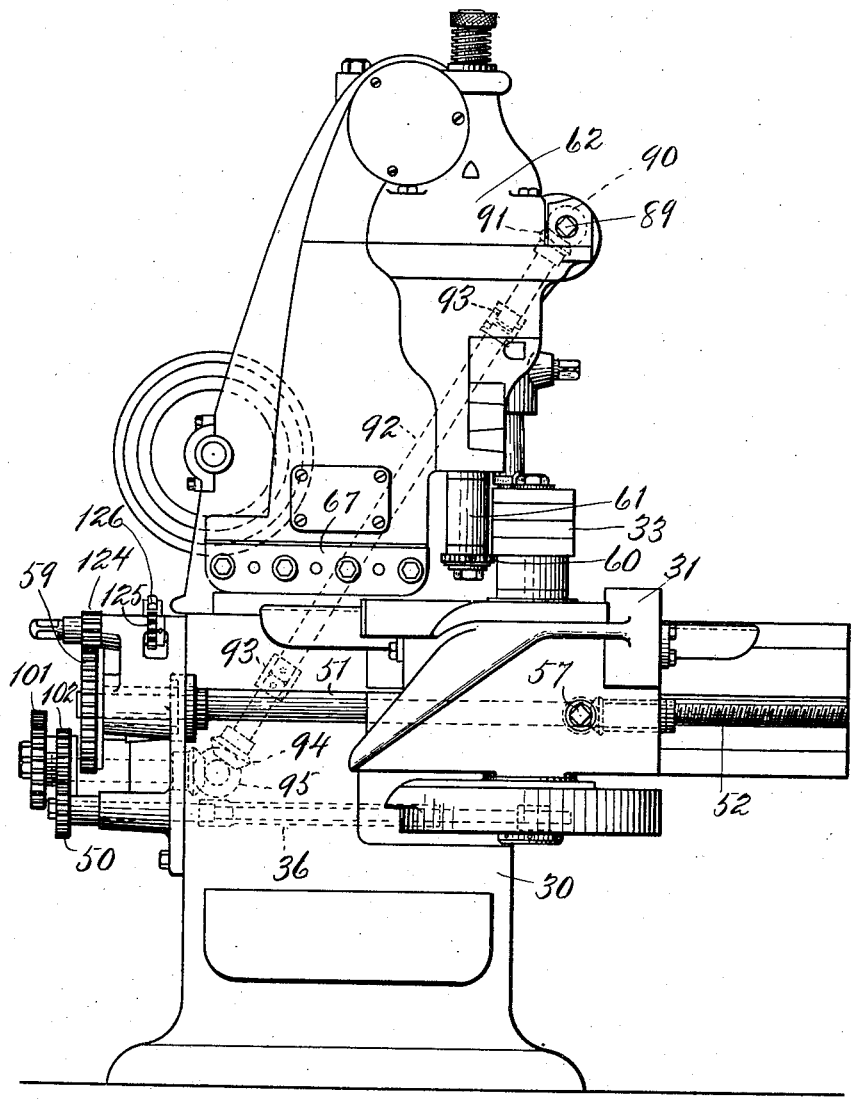

No. 879,531.

PATENTED FEB. 18, 1908.

E. R. FELLOWS.
GEAR GENERATING MACHINE.
APPLICATION FILED NOV. 27, 1903.

10 SHEETS—SHEET 2.

Witnesses:

Inventor.
E. R. Fellows.
by
Attys.

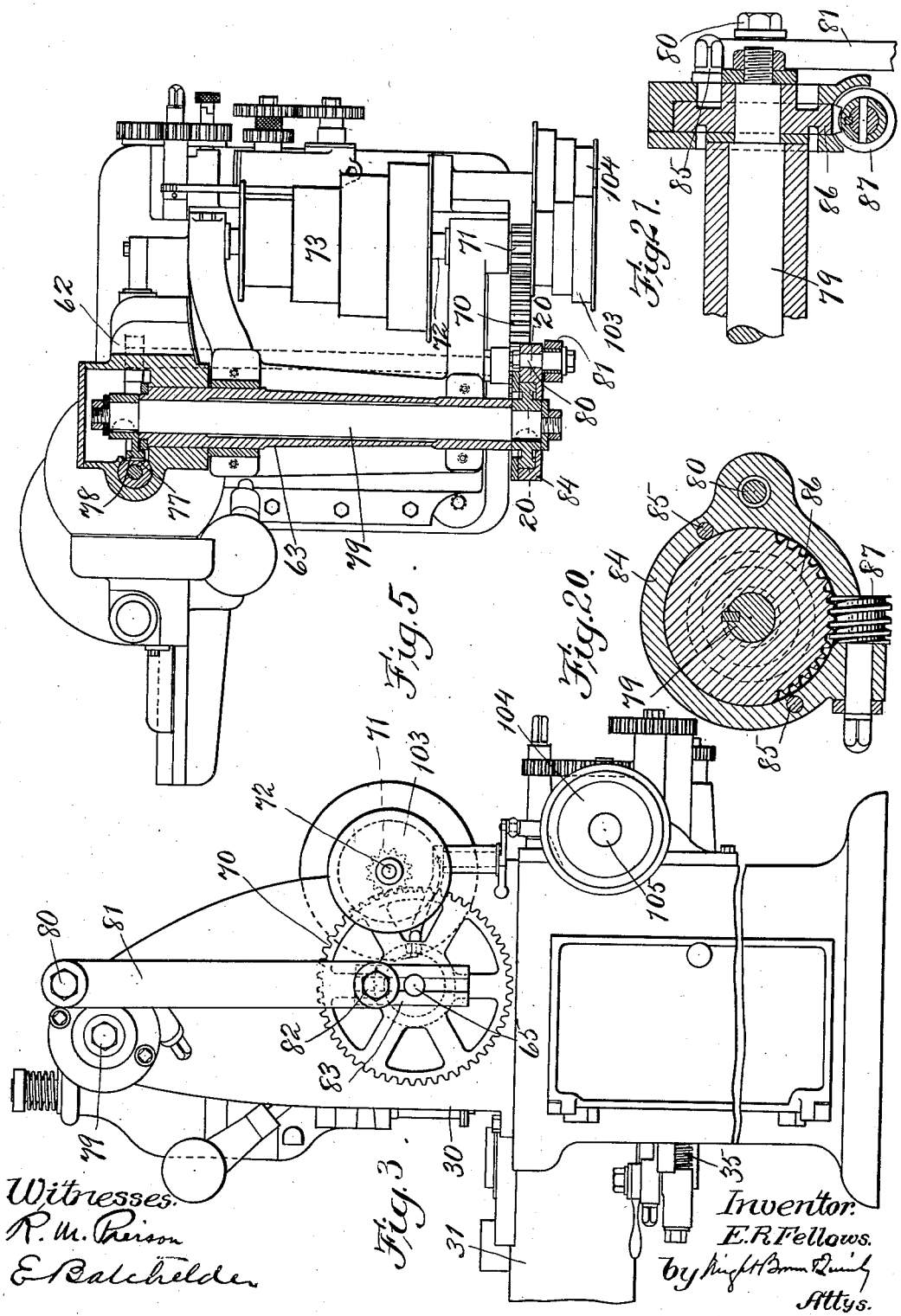

No. 879,531.　　　　　　　　　　　　　PATENTED FEB. 18, 1908.
E. R. FELLOWS.
GEAR GENERATING MACHINE.
APPLICATION FILED NOV. 27, 1903.
10 SHEETS—SHEET 4.
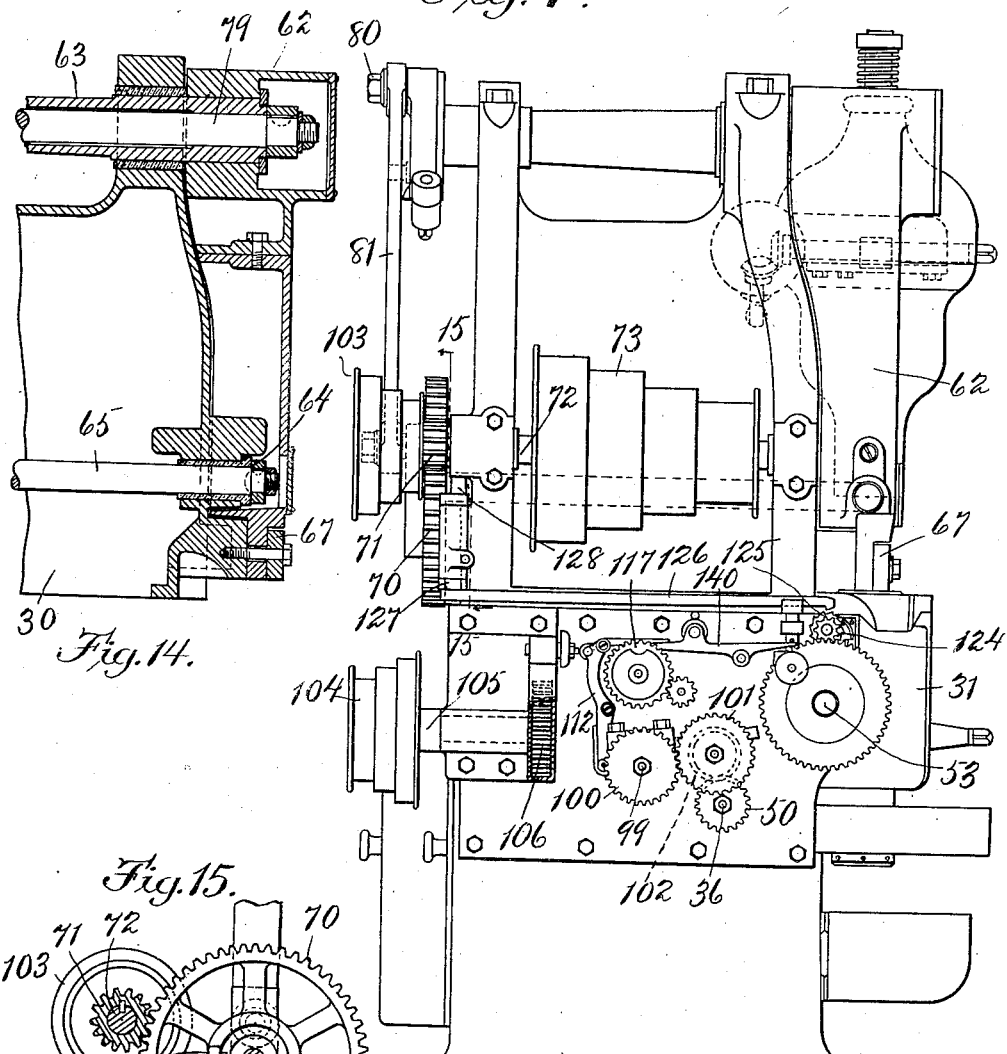
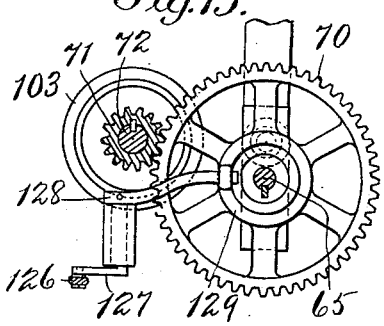
Witnesses.
R. M. Pierson
E. Batchelder
Inventor.
E. R. Fellows.
by Wright Brown & Quinby
Attys.

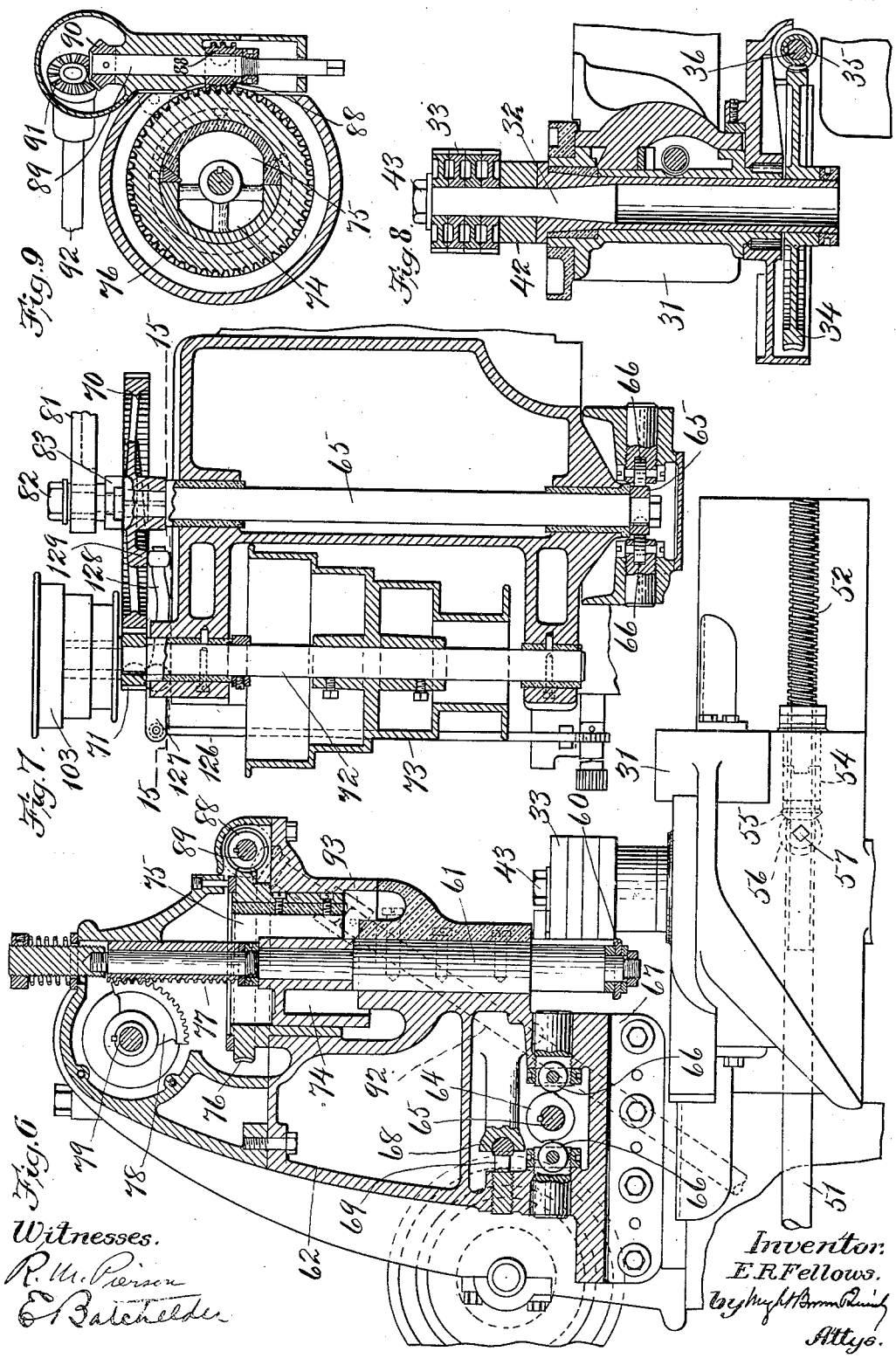

No. 879,531. PATENTED FEB. 18, 1908.
E. R. FELLOWS.
GEAR GENERATING MACHINE.
APPLICATION FILED NOV. 27, 1903.
10 SHEETS—SHEET 6.

Witnesses.
Inventor.
E. R. Fellows.
Attys.

No. 879,531. PATENTED FEB. 18, 1908.
E. R. FELLOWS.
GEAR GENERATING MACHINE.
APPLICATION FILED NOV. 27, 1903.
10 SHEETS—SHEET 7.
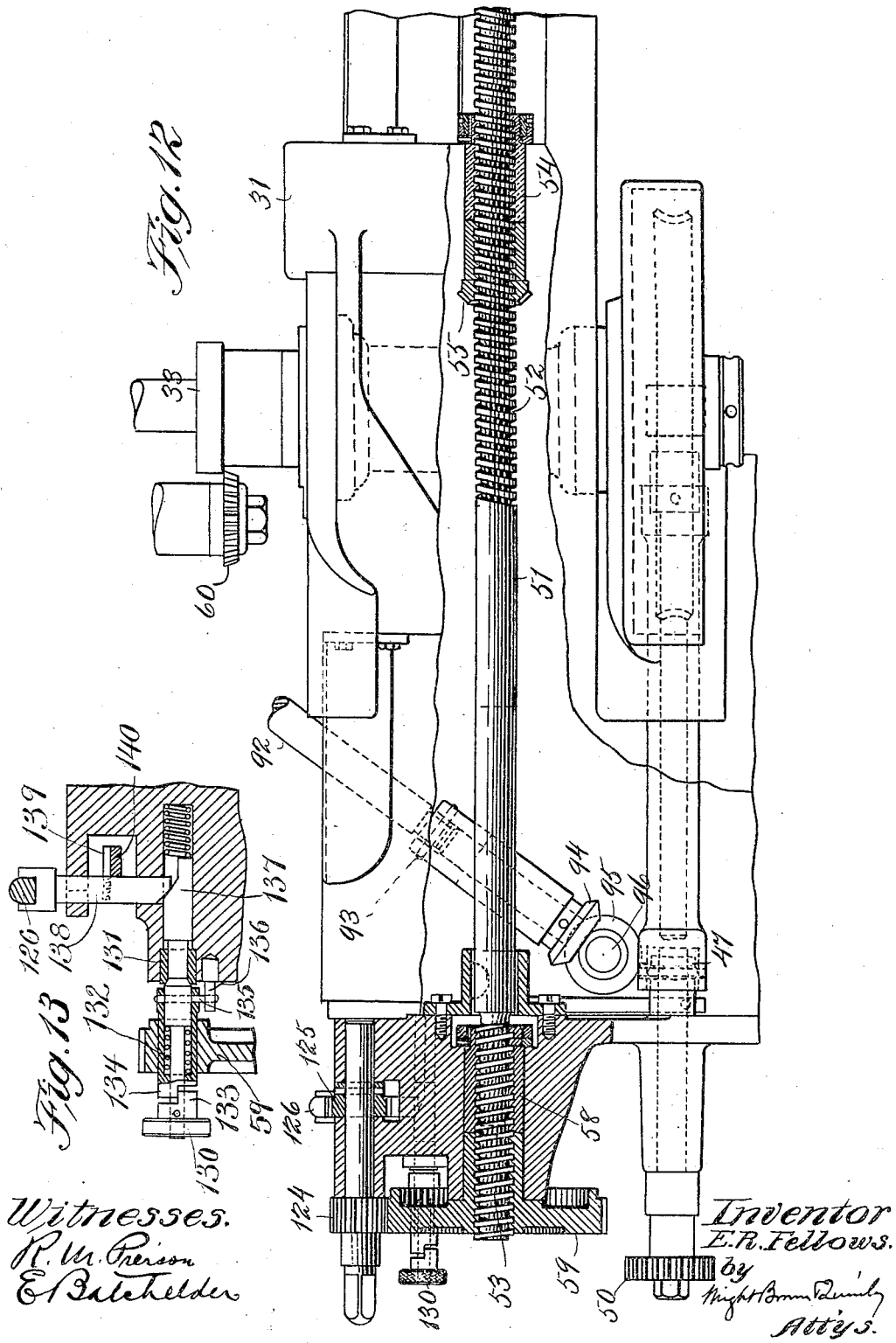
Witnesses.
R. M. Pierson
E. Batchelder
Inventor
E. R. Fellows.
by
Wright Brown Quimby
Atty's.

No. 879,531. PATENTED FEB. 18, 1908.
E. R. FELLOWS.
GEAR GENERATING MACHINE.
APPLICATION FILED NOV. 27, 1903.
10 SHEETS—SHEET 8.
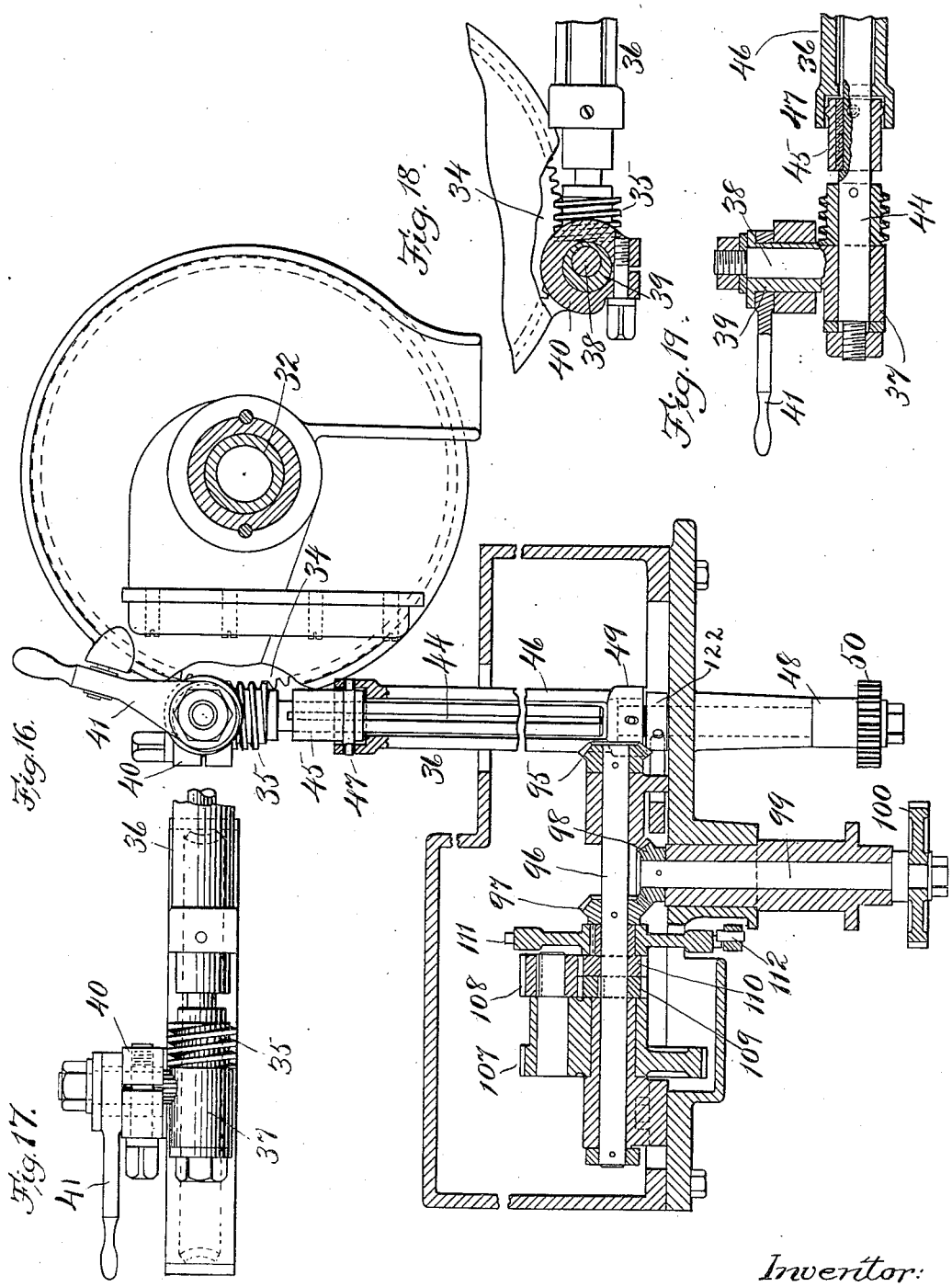
Witnesses.
R. M. Pierson
E. Batchelder
Inventor:
E. R. Fellows.
By Wright Brown & Quimby
Attys.

No. 879,531.

E. R. FELLOWS.
GEAR GENERATING MACHINE.
APPLICATION FILED NOV. 27, 1903.

PATENTED FEB. 18, 1908.

10 SHEETS—SHEET 9.

Witnesses.
R. M. Pierson
E. Batchelder

Inventor:
E. R. Fellows.
by Wright Brown & Quinby
Attys.

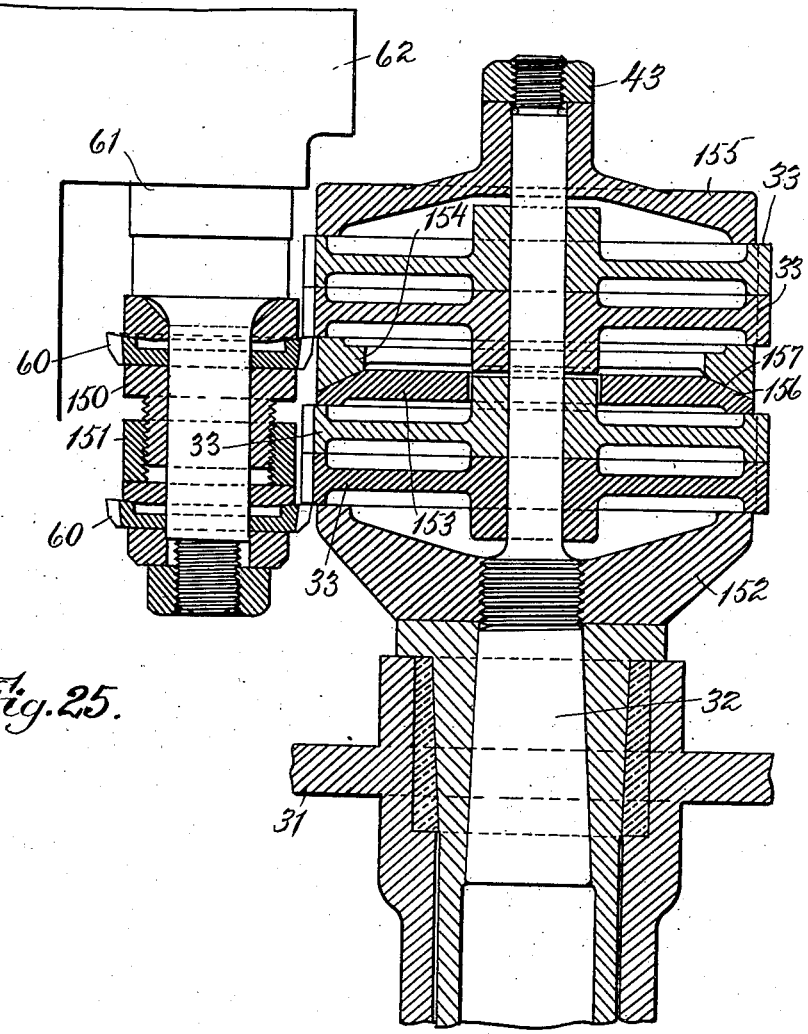

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

GEAR-GENERATING MACHINE.

No. 879,531.  Specification of Letters Patent.  Patented Feb. 18, 1908.

Application filed November 27, 1903. Serial No. 182,739.

*To all whom it may concern:*

Be it known that I, EDWIN R. FELLOWS, of Springfield, in the county of Windsor and State of Vermont, have invented certain new and useful Improvements in Gear-Generating Machines, of which the following is a specification.

This invention relates to gear-generating machines of the type described in my former patents No. 579,708, March 30, 1897, and No. 676,227, June 11, 1901, for planing gears or racks on the generating system, a gear-shaped cutter being reciprocated to impart a planing movement and rotated in conjunction with the work to impart a feed movement equivalent to that of intermeshing gears or a rack and pinion.

The present invention consists in certain improvements on machines described in said patents, designed to simplify the machine and improve the quality of work performed thereby.

One feature of the invention relates to the backing-off mechanism whereby the cutter is relieved from contact with the work on the return stroke of the cutter, the present embodiment including an oscillatory frame or saddle which journals the rotating and reciprocating cutter, said saddle being oscillated to give the backing-off movement and having suitable novel connections whereby the reciprocating and rotary movements are imparted to the cutter, and whereby the latter is adjusted for length of stroke, this phase of the invention including novel mechanism for imparting the backing-off movement and for holding the cutter bearing rigid during the cutting stroke.

The invention further includes improved means for disconnecting the work-index wheel from its driving device so as to allow the work to be freely rotated by hand when desired, and suitable universal driving connections for permitting such disconection.

An additional feature is the improved means for stopping the rotary feed when a circuit of the work has been made, said means including a rotary abutment to trip the member which holds the feed in operation, intermittent feeding mechanism for said rotary abutment, and means whereby the depth-feed controls the feed of the rotary abutment, there being further provisions whereby the rotary abutment and its coöperating member controlling the rotary feed of the cutter are placed by the depth-feed locking-bolt in the proper mutual relation for beginning the rotary feed of said abutment.

Finally, the invention comprises improved work-holding means whereby natural errors in the blanks are compensated for and prevented from becoming cumulative.

Figure 2:
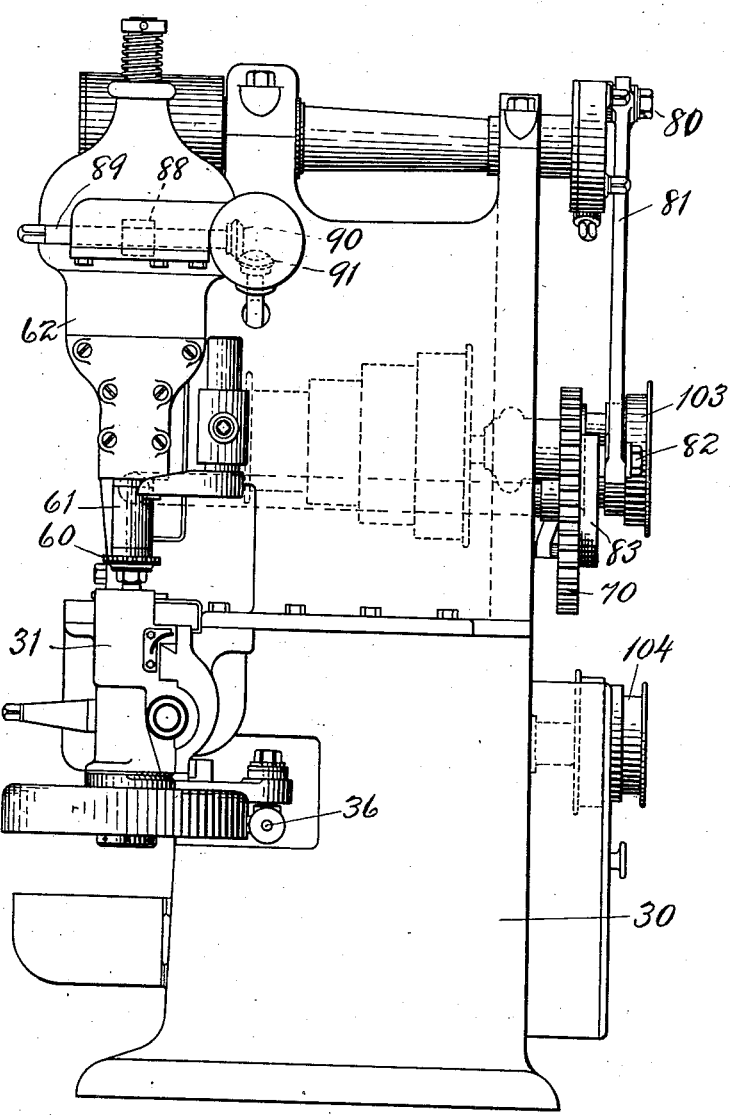
Figure 10:
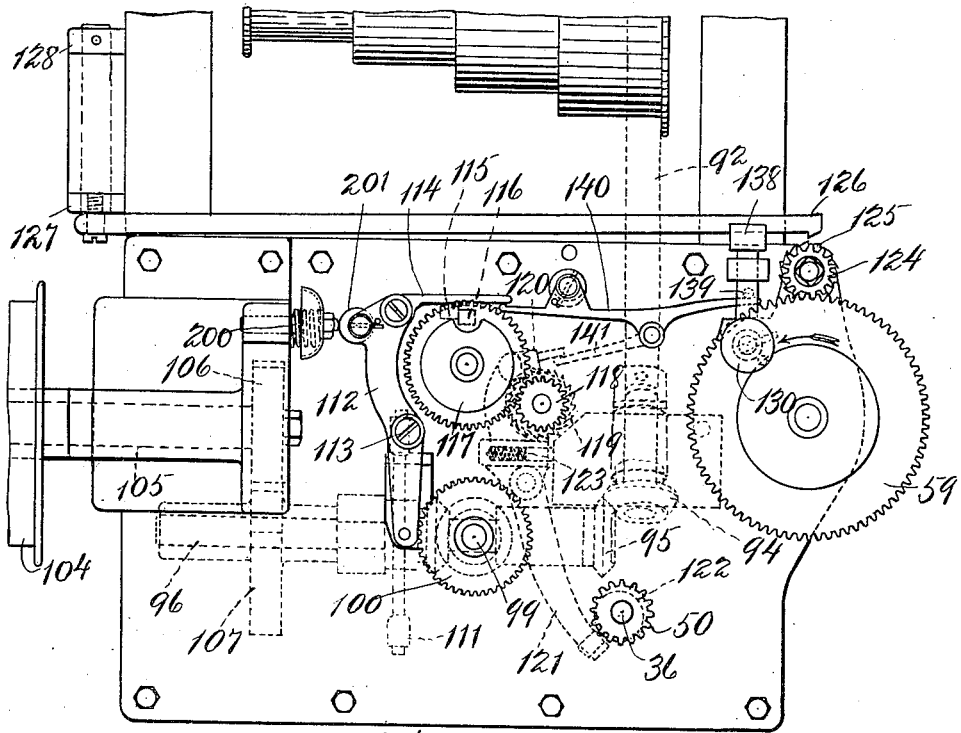
Figure 11:
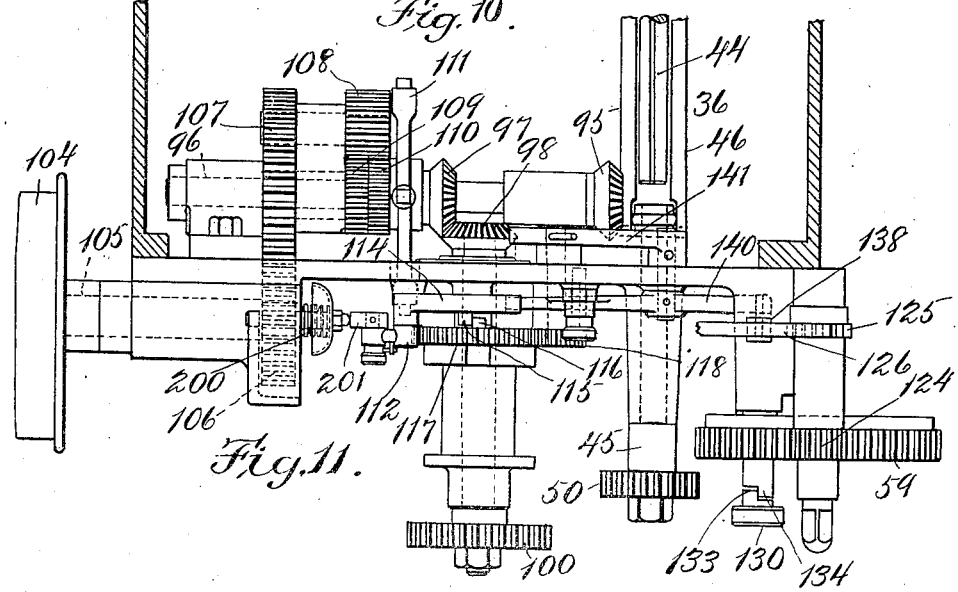
Figure 22:
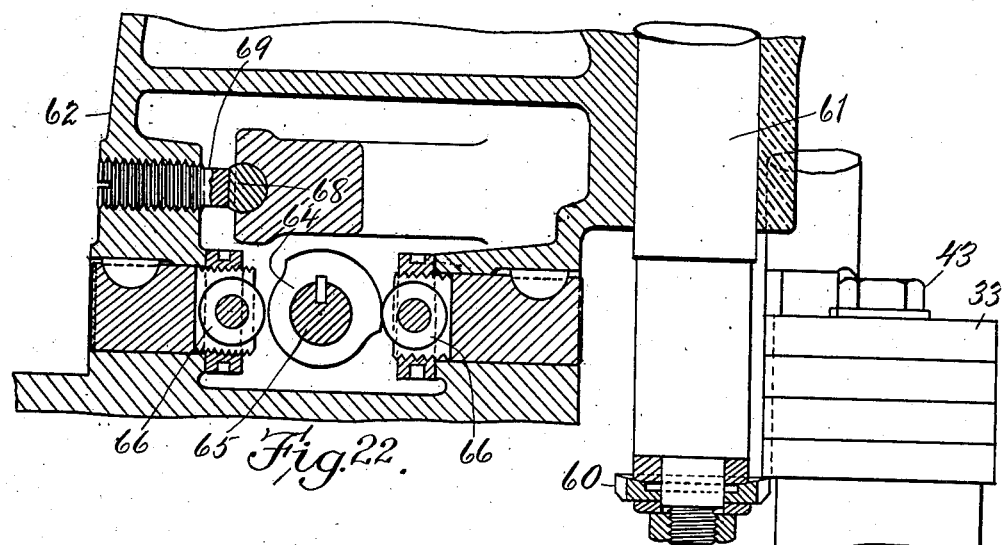
Figure 23:
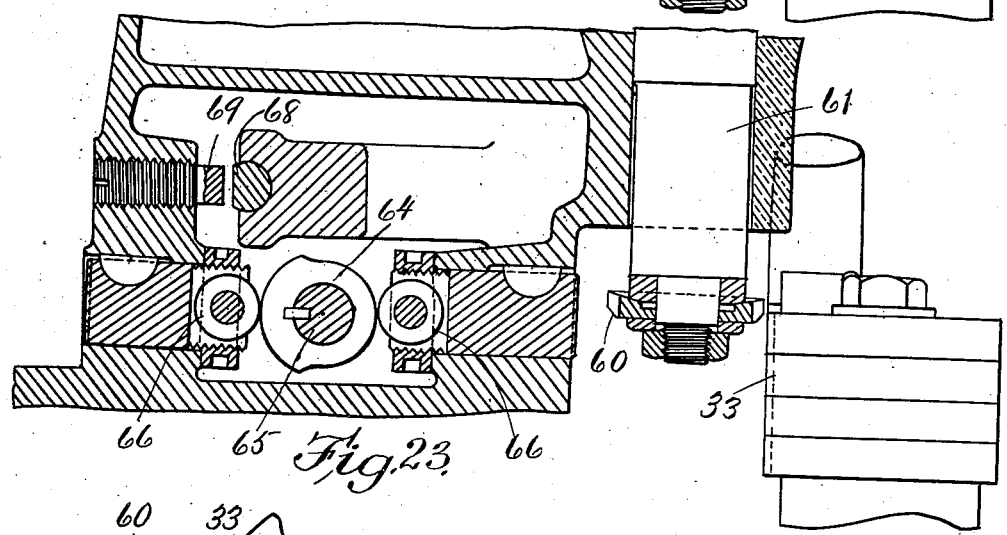
Figure 24:
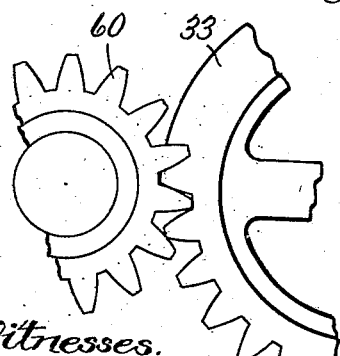

Of the accompanying drawings,—Figure 1 represents a front elevation of a gear-shaper embodying this invention. Fig. 2 represents a right-hand end elevation thereof. Fig. 3 represents a rear elevation. Fig. 4 represents a left-hand end elevation. Fig. 5 represents a horizontal section through the pivot of the saddle. Fig. 6 represents an enlarged vertical transverse section with the base omitted. Fig. 7 represents a horizontal section through the driving-cone and saddle-oscillating shaft. Fig. 8 represents a vertical transverse section through the work-holder and connected parts. Fig. 9 represents a horizontal section through the cutter index wheel. Fig. 10 represents an enlarged left-hand end elevation of parts on the base. Fig 11 represents a plan view of said parts. Fig. 12 represents a vertical section showing the work-supporting saddle or slide and its feeding devices. Fig. 13 represents a vertical section through the locking-pin of the depth-feed wheel, showing parts controlled thereby. Fig. 14 represents a transverse vertical section of the saddle. Fig. 15 represents a section on line 15—15 of Fig. 7. Fig. 16 represents a horizontal section showing the rotary-feed mechanism. Fig. 17 represents a rear elevation of the work-feeding worm and means for throwing the same out of gear to permit the free rotation of the blank-holder. Fig. 18 represents a horizontal section of said parts. Fig. 19 represents a vertical section thereof. Fig. 20 represents a section on line 20—20 of Fig. 5, showing the means for adjusting the cutter-reciprocating wrist with respect to the pinion segment operated thereby. Fig. 21 represents a transverse vertical section of said parts. Fig. 22 represents a vertical section showing the cutter and work and the lower part of the saddle, the cutter being advanced for the cutting operation. Fig. 23 represents the same parts with the cutter backed off after the cutting stroke. Fig. 24 represents a plan view showing the action of the cutter on the work.

Fig. 25 represents a vertical section showing modified work and cutter holders for planing a plurality of gear-blanks simultaneously and compensating for errors in the blanks.

The same reference characters indicate the same parts in all the figures.

In the drawings, 30 is the frame having a base part and an upper part, the base having guides for a work-holding slide or apron 31. The latter journals the work-spindle 32 upon which the gear-blanks 33 are clamped, said spindle having the index worm-wheel 34 at its lower end. Index-wheel 34 is rotated by worm 35 on a shaft 36, and said shaft has a bearing 37 mounted as shown in detail in Figs. 17, 18 and 19. The bearing has a vertical stud 38 mounted eccentrically in a sleeve 39 held in a friction-clamp 40 and rotatable by a handle 41 whereby the worm may be thrown into and out of mesh with the index-wheel 34, thereby permitting the blank-holder 42, 43 to be freely rotated when necessary. The shaft 36 is composed of a section 44 splined to a sleeve-section 45, a middle section 46 connected by universal joint 47 with sleeve-section 45, and a stationarily-journaled section 48 on the machine-base connected by universal joint 49 with section 46 and carrying gear 50 (Figs. 4, 10 and 16) at its outer end.

The universal joints in shaft 36 permit the worm 35 to be thrown into and out of gear, and the spline in said shaft permits the travel of the work-slide 31. Such movement of the slide is produced for purposes of bringing different diameters of work into operative relation with the cutter and also for giving the depth-feed to the blank at the beginning of operations. To move the work-slide there is provided a non-rotating screw 51 having threads 52 53 (Fig. 12). Held against axial movement in the slide is a nut 54 manually rotated by bevel-gears 55 56 and spindle 57 and connected to rotate with gear 55 by a tongue and notch connection shown by dotted lines in Fig. 6. On the thread 53 is a nut 58 attached to the wheel 59, by a similarly constructed connection (not shown), for axially shifting the rod 51 to impart the depth-feed hereinafter again referred to.

60 is the gear-shaped planing cutter fixed to the lower end of a spindle 61 journaled in a saddle 62. This saddle is given a slight oscillatory movement to back-off the cutter on the return stroke of the latter. The saddle is pivoted on a long quill 63 best seen in Fig. 5 and is oscillated by a cam 64 on a shaft 65, said cam engaging rollers 66 adjustable for wear. A fixed gib 67 guides the lower end of the saddle. 68 is a fixed stop on the machine-frame engaged by a hardened adjustable stud or pin 69 on the saddle when the latter is swung forward, the cam 64 serving to hold this pin hard against the said stop and thus maintain the saddle and cutter-spindle rigidly in acting position. This is a feature of considerable practical importance as it avoids chattering and other inaccuracies due to insecure support of the work or cutter. The shaft 65 is rotated by gears 70 71 (Fig. 7) from the main driving-shaft 72 carrying the large belt-cone 73.

The vertical movements of the cutter-spindle 61 are guided by a semi-circular gib 74 thereon engaging a semi-circular gib 75 on the cutter index-wheel 76 (Figs. 6 and 9) and these vertical cutting and return movements are produced by a rack 77 on the cutter-spindle, a pinion segment 78 meshing with the rack and mounted on a rock-shaft 79 which rotates in the quill 63. The shaft 79 carries a wrist-pin 80 connected by link or pitman 81 with a second wrist-pin 82 mounted in a radial slotted guide 83 on the gear-wheel 70 (Fig. 3). When the wrist 82 is adjusted radially to vary the length of stroke of the cutter-spindle it is desirable to correspondingly change the position of the cutter-spindle so that it may start its cutting stroke from the same position as before. To this end the wrist-pin 80 is mounted as shown in detail in Figs. 3, 5, 20 and 21. The wrist-pin is mounted on a two-part plate 84 clamped by bolts 85 to a worm-gear segment 86 keyed on the shaft 79. The plate 84 journals a worm 87 meshing with said worm-gear segment. It is obvious that on engaging the spindle of the worm 87 by a wrench and rotating the worm, the rotary position of the shaft 79 with respect to the wrist 80 will be varied.

The machine may be arranged to cut either upwardly or downwardly, the cutter being reversed to effect different directions of cutting. It will be seen in Fig. 3 that the slotted wrist-guide 83 extends on both sides of shaft 65. By shifting the wrist 82 to the opposite side of the shaft from that shown, the timing of the backing-off mechanism relatively to the stroke of the cutter will be reversed.

For imparting rotary feed movement to the cutter there is journaled on the saddle 62 a worm 88 meshing with the index worm-wheel 76 to which the cutter-spindle 61 is splined by the gibs 74 75. The spindle 89 of worm 88 connects through bevel gears 90 91 (Fig. 9) with a diagonal shaft 92 composed of end and middle sections connected by universal joints 93, said joints giving sufficient play to permit the oscillatory movements of the saddle 62. The lower stationarily-journaled section of shaft 92 connects by bevel gears 94 95 (Figs. 12 and 16) with a shaft 96, best seen in Fig. 16, which imparts the rotary feed to both the work and the cutter. Shaft 96 is connected with the work-rotating shaft 36 by bevel gears 97 98, shaft 99, spur gear 100 thereon, and spur gears 101 102 and 50. The gears 101 102 which are shown in Fig. 4 but omitted in Figs. 10 and 16, are change-gears adapted to be changed for different diameters of work.

For rotating the shaft 96 and hence imparting the rotary feed to work and cutter, there are provided the reverse cone-pulleys 103 104 adapted to be belted together and located respectively on the main driving-shaft 72 and a counter-shaft 105, the latter carrying a gear 106 meshing with a gear 107 (Figs. 4 and 16). Gear 107 loosely surrounds shaft 96 and carries a planetary gear 108 meshing with a gear 109 fast on shaft 96, and an alined gear 110 loose thereon. One of the gears 109 110 has one more tooth than the other so that when gear 110 is held from rotation the motion of gear-wheel 107 is transmitted to shaft 96 in a largely reduced ratio. If gear 110 is released the gear 107 rotates without producing rotation of the shaft 96, whereby the rotary feed of the work and spindle may be stopped.

Fast on the hub of gear 110 are a series of arms 111 adapted to be engaged or released by the lower end of a lever 112 fulcrumed at 113. A dog or latch 114 pivoted to the upper end of said lever carries an abutment 115 engageable by an abutment 116 on a gear-wheel 117 (Figs. 10 and 11). The feed motion for said wheel comprises an intermeshing gear 118, ratchet 119 on said gear, pawl 120 engaging said ratchet and pivoted to lever 121, and cam 122 on shaft 36 for oscillating lever 121 against the spring 123. The wheel 117 makes slightly more than one rotation for a rotation of the work index-wheel 34 and when the abutment 116 strikes the abutment 115 the lever 112 is oscillated anti-clockwise and the gear 110 released, thereby stopping the rotary feed of work and cutter. The latter feed is later reset by the act of withdrawing the locking-pin 130 and thereafter operates continuously until tripped, so that both rotary and depth feeds are in operation at the same time at the beginning of the cut. This procedure, however, may be varied and the depth-feed finished before the rotary feed is begun, as will appear later.

The depth feed is performed by rotating pilot-wheel 59 through the medium of a gear 124 intermeshing therewith, a ratchet 125 on the shaft of said gear, and a pawl 126 constantly reciprocated by rock-arms 127 128 (Figs. 10, 7 and 15), the latter engaging a cam 129 on gear-wheel 70.

The pilot-wheel 59 carries as shown particularly in Figs. 10, 12 and 13, a locking pin 130 projected toward a fixed keeper or socket 131 by a spring 132 and adapted to be held out of locking position by a segmental boss 133 on the pin riding on a complemental boss 134 on the pilot-wheel. To automatically project the pin 130 into locking position when it comes opposite its keeper 131, there is a projection 135 on the pin adapted to engage a fixed projection 136. The locking pin 130 controls a spring-projected bolt 137 having a cam incline acting on a vertically-movable prop 138 which supports and guides the pawl 126. Said prop has a pin 139 overlying one arm of a lever 140, the opposite arm of said lever residing under the dog 114. A third arm or finger 141 on the shaft of lever 140 resides under the pawl 120.

The operation of the parts last described is as follows:—Assuming the machine to be stopped, the locking pin 130 is withdrawn and pilot-wheel 59 rotated backward anti-clockwise so as to retract the slide 31 the desired distance for the depth or regular feed. The withdrawal of pin 130 allows the prop 138 to drop and the feed-pawl 126 engages its ratchet. Also pin 139 acting on lever 140 throws out the pawl 120 through arm 141 and raises dog 114 so that abutment 116 may ride under abutment 115. This resets the rotary feed for work and cutter, for a spring 200, acting on lever 112, then moves the lower end of the latter into the path of the arms 111. When the machine is started the pawl 126 rotates the pilot-wheel 59 step-by-step back to initial position, thereby producing the depth-feed and the pin 130 automatically locks by the engagement of its projection 135 with the fixed projection 136. This raises the prop 138 and throws out the constantly-reciprocating pawl 126 so as to stop the depth-feed. The left-hand of lever 140 being heaviest, said end descends and throws in the pawl 120 and drops the abutment 115 on the abutment 116, the former dropping into the circuit of the latter when the feed of wheel 117 commences. This occurs when the prop 138 rises on completion of the depth-feed and the pawl 120 is dropped on its ratchet. The constantly-reciprocating lever 121 through the pawl 120, ratchet 119 and gear 118 rotates the gear 117 step-by-step until a circuit of the work is completed, whereupon the rotary feed is automatically stopped as aforesaid. By locating the trip mechanism 111 112 115 116, etc., in the position described, any error in the work which might result from locating the trip on the work index-wheel is avoided.

To render the rotary feed inoperative while the depth-feed takes place, an eccentric abutment 201 on lever 112 may be turned to render the spring 200 inoperative on said lever, the lever being swung out of the path of arms 111. After the depth-feed is complete, the rotary feed may then be set by hand so as to become operative by restoring the eccentric 201 and lever 112.

It is obvious that the principles of this machine apply also to the generation of racks, and the term "gear" in the claims is employed in its generic sense, as including racks.

In Fig. 25, I have shown means for operating simultaneously on a plurality of blanks or gangs of blanks with a plurality of cutters. In this instance two cutters 60 60 are shown as mounted on the cutter-spindle 61 and separated by a spacer composed of threaded members 150 151 screwing onto each other and adapted to compensate for slightly varying distances between the adjacent faces of the cutters. On the work-spindle 32, I have shown two gangs of blanks 33, the lower blank of the lower gang resting on a face-plate 152. A face-plate 153 rests on the upper blank of the lower gang. The lower blank of the upper gang rests on a face-plate 154 and a face-plate 155 rests on the upper blank of the upper gang. A nut 43 on the work-spindle clamps the blanks and face-plates together. The contacting faces 156 157 of the face-plates 153 154 are complemental zones of a sphere so that the upper gang of blanks is capable of a slight universal adjustment on the lower gang. When blanks are applied one upon top of another the errors in thickness of said blanks are apt to become cumulative and when several blanks are thus applied, the topmost one will often be somewhat out of line, giving the work-arbor a tendency to bend. The universal adjuster which I provide between successive blanks compensates for the errors in thickness in the blanks and prevents these errors from becoming cumulative, thus greatly enhancing accuracy of results.

It is not essential that the two gangs of blanks as shown in the drawings be operated on by two cutters on the cutter-spindle, but this is an advantage since if only one cutter were employed it would require more than double the traverse of two cutters on the working stroke.

I claim:—

1. In a machine having a gear-shaped cutter for cutting gear teeth in a blank by a planing cut and generating the curves of the teeth by simultaneous and equal peripheral travel of cutter and blank, a cutter holder, a gear blank holder, means for imparting generating feed movements to said holders, rotary means for reciprocating one of the latter to impart the cutting movement, a frame carrying said reciprocable holder and pivoted on the axis of said rotary means, and means for oscillating the frame to separate the cutter and work on the non-cutting stroke.

2. In a machine having a gear-shaped cutter for cutting gear teeth in a blank by a planing cut and generating the curves of the teeth by simultaneous and equal peripheral travel of cutter and blank, a rotary cutter spindle, a gear blank holder, means for simultaneously rotating said spindle and blank holder to give the tooth-generating movements thereto, a frame in which the cutter spindle is journaled, an oscillatory driver connected to reciprocate the spindle for giving cutting movements to the cutter, said frame being pivoted to swing about the axis of said oscillatory driver, and means for swinging the frame to free the cutter on the return stroke thereof.

3. In a machine having a gear-shaped cutter for cutting gear teeth in a blank by a planing cut and generating the curves of the teeth by simultaneous and equal peripheral travel of cutter and blank, a pivoted frame adapted to swing toward and from the work-holder, a cutter spindle journaled and reciprocably movable in said frame, a driver for reciprocating said spindle to move the cutter past the work oscillatable about the pivotal axis of said frame, means for swinging the frame to relieve the cutter after each cutting stroke, spindle-rotating means mounted in said frame for imparting the generating feed movements to the cutter, and a drive for said spindle-rotating means including a shaft jointed for universal movement to permit swinging of the frame.

4. In a gear-generating machine having a gear-shaped metal planing cutter, a work-holder and means for giving lateral tooth-generating feed movements simultaneously to the cutter and work-holder, a cutter spindle, an oscillatory driver for reciprocating the spindle and cutter, a frame journaling the spindle and pivoted upon the axis of said driver to swing toward and from the work to relieve the cutter on the return stroke thereof, a cam, and abutments carried by the frame bearing against the cam on opposite sides of its center for oscillating the frame.

5. In a gear-generating machine having a gear-shaped metal planing cutter, a work-holder and means for giving lateral tooth-generating feed movements simultaneously to the cutter and work-holder, a cutter spindle, an oscillatory driver for reciprocating the spindle and cutter, a frame journaling the spindle and pivoted upon the axis of said driver to swing toward and from the work to relieve the cutter on the return stroke thereof, a cam, and adjustable abutments carried by the frame having anti-friction rolls bearing against the cam on opposite sides of its center for oscillating the frame.

6. In a gear-generating machine having a stationary main frame, a gear-shaped metal planing cutter, a work-holder and means for giving simultaneous lateral tooth-generating feed movements thereto, a cutter spindle, an oscillatory driver for reciprocating the spindle and cutter, a swinging frame journaling the spindle and pivoted upon the axis of said driver to swing toward and from the work to relieve the cutter on the return stroke thereof, a cam, abutments carried by the frame bearing against the cam on opposite sides of its center for oscillating the swinging frame, and coöperating stops on the main and swinging frames arranged to abut when the swinging frame is in cutting position to hold said frame rigid during the operative stroke of the cutter.

7. In a gear-generating machine, a cutter-spindle, means for rotating the same to impart a feed movement thereto, an oscillatory member for reciprocating said spindle, a wrist on said member, means for adjusting said wrist rotatably of the member, a crank device having a radially-adjustable wrist, and a pitman connecting said wrists.

8. In a gear-generating machine, a cutter-holder, a movable work-support carrying a feed gear, driving mechanism for imparting simultaneous tooth generating feed movements to said cutter-holder and work-support, and a trip mechanism mounted on a stationary support apart from the work-support and timed with the feed of said cutter-holder and work-support for automatically stopping the said feed upon the completion of the feed movement.

9. In a gear-generating machine, work and cutter holders, means for imparting generating feed movements thereto, a tripping abutment adapted to stop the feed, a feeding device for propelling said abutment including a constantly-operating feed member, a depth-feed having a locking device, and mechanism whereby the operation of said locking device throws said constantly-operating feed member into and out of connection with the tripping abutment.

10. In a gear-generating machine, work and cutter holders, means for imparting generating feed movements thereto, tripping mechanism for automatically stopping said feed movements, a depth-feed, a locking device therefor, and connections for resetting said tripping mechanism by the operation of said locking device.

11. In a gear-generating machine, work and cutter holders, means for imparting generating feed movements thereto, tripping means for interrupting said feed movements, actuating mechanism for said means, a depth feed mechanism for increasing the amount of penetration of the cutter into the work, and controlling means for said tripper-actuating and depth feed mechanisms for rendering each inoperative while the other is active.

12. In a gear-generating machine, a rotary work-spindle, a plurality of gear-blank holding devices alined on said spindle, and a compensating adjuster between said devices for adjusting the alinement thereof and of blanks of uneven thickness.

13. In a gear-generating machine, a rotary work-spindle, a plurality of gear-blank holding devices alined on said spindle, and a universal adjuster between said devices.

14. In a gear-generating machine, a rotary work-spindle, a plurality of pairs of gear blank holding plates on said spindle, complemental spherical members between adjacent plates, automatically and universally adjustable on each other, and means for clamping said plates together and upon gears held between them.

15. In a gear-generating machine, a gear-blank holder and a cutter-spindle one of which members has a reciprocating cutting movement longitudinally of the cutter-spindle, means for imparting generating feed movements to said holder and spindle, a plurality of multi-toothed gear-shaped generating cutters alined on said spindle, whereby a plurality of gear-blanks may be operated on simultaneously with a cutting movement corresponding to the cut of a single cutter, and means for imparting a reciprocating cutting movement to the said movable member.

16. In a gear-generating machine, a cutter-support, a pair of gear-shaped generating cutters thereon, and an extensible cutter-spacer interposed between said cutters.

17. In a gear-generating machine, a cutter-support, a pair of gear-shaped generating cutters thereon, and an extensible cutter-spacer interposed between said cutters and comprising members screwing on each other.

In testimony whereof I have affixed my signature, in presence of two witnesses.

EDWIN R. FELLOWS.

Witnesses:
M. L. LAWRENCE,
EDWARD MILLER.